US008825686B2

United States Patent
Boag et al.

(10) Patent No.: US 8,825,686 B2
(45) Date of Patent: Sep. 2, 2014

(54) EXPRESSION EVALUATION OVER MULTIPLE DATA MODELS

(75) Inventors: Scott A. Boag, Woburn, MA (US); Frank J. Budinsky, Newmarket (CA); Christopher F. R. Markes, Southampton (GB); Ilene R. Seelemann, Markham (CA)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/170,013

(22) Filed: Jun. 27, 2011

(65) Prior Publication Data

US 2012/0330997 A1  Dec. 27, 2012

(51) Int. Cl.
*G06F 17/30* (2006.01)

(52) U.S. Cl.
USPC ..... 707/758; 707/760; 707/769; 707/E17.014

(58) Field of Classification Search
USPC ......... 707/760, 803, 806, 807, 808, 809, 758, 707/769, E17.014; 715/234, 239, 236
See application file for complete search history.

(56) References Cited

U.S. PATENT DOCUMENTS

| | | | |
|---|---|---|---|
| 6,836,857 B2 * | 12/2004 | Ten-Hove et al. | 714/34 |
| 6,928,449 B2 * | 8/2005 | Ten-Hove et al. | 715/236 |
| 7,730,080 B2 * | 6/2010 | Liu et al. | 707/765 |
| 7,877,366 B2 * | 1/2011 | Wang et al. | 707/702 |
| 2003/0078906 A1 * | 4/2003 | Ten-Hove et al. | 707/1 |
| 2006/0129993 A1 * | 6/2006 | Belisario et al. | 717/124 |
| 2007/0299834 A1 * | 12/2007 | Liu et al. | 707/4 |
| 2008/0077939 A1 * | 3/2008 | Harran et al. | 719/314 |
| 2009/0031279 A1 * | 1/2009 | Budinsky et al. | 717/104 |

* cited by examiner

*Primary Examiner* — Phong Nguyen
(74) *Attorney, Agent, or Firm* — Steven M. Greenberg, Esq.; CRGO Law

(57) ABSTRACT

Embodiments of the present invention provide a method, system and computer program product for expression evaluation of content instances of multiple different data models. In an embodiment of the invention, a method for expression evaluation of content instances over multiple different data models comprises loading a schema for a content instance in memory of a computer and evaluating an expression against the content instance. In response to a failure during the evaluation of the expression against the content instance to resolve a reference to an element specified by the expression, an alias reference for the element can be identified in the schema and the evaluation can be completed using the alias reference in lieu of the specified reference.

9 Claims, 2 Drawing Sheets

EXPRESSION EVALUATION OVER MULTIPLE DATA MODELS

BACKGROUND OF THE INVENTION

1. Field of the Invention

The present invention relates to markup language processing and more particularly to expression language processing of markup.

2. Description of the Related Art

Data can be embedded and communicated within markup language encoded content. Processing a markup language document can require the application of query expressions to the markup language document to navigate, extract and process the embedded data. The navigation, extraction and processing of data in a markup language document can be facilitated through the use of information about the content, referred to hereinafter as "meta-information". Meta-information can be provided with the original content and can be used to assist the transcoding process in uniquely identifying portions of the content. Notably, meta-information can be created without any modification of the original content if the meta information is described separately from the content. In this regard, the separate provision of such meta-information often is referred to as "external annotation". XML, a W3C recommendation (Nov. 26, 2008) is one such markup language. It's meta-information is specified by XML-schema, also a W3C recommendation (Oct. 28, 2004).

External annotations consist of the meta-information and corresponding references to portions of the content. The meta-information and references typically are described according to the Resource Description Framework (RDF) and the XML Path/Pointer (XPath/XPointer) specification. XPath is a syntax for identifying particular sections of markup, such as an HTML or an XML formatted document. Each of the RDF and XPath/XPointer specifications have been standardized by the World Wide Web Consortium, referred to hereafter as the "W3C".

XPath, described in depth in James Clark and Steve DeRose, *XML Path Language (XPath) Version* 1.0, W3C Recommendation (Nov. 16, 1999 is a computer language to address parts of content—namely an XML document—in support of which XPath provides basic facilities for manipulating strings, numbers and boolean values. XPath uses a compact, non-XML syntax to facilitate the use of XPath technology within Universal Resource Indicators (URI) and an XML attribute value. XPath operates on the abstract, logical structure of an XML document, rather than its surface syntax. Thus, XPath is aptly named in view of its URL-like path notion for navigating through the hierarchical structure of an XML document. *XML Path Language (XPath) Version* 2.0, W3C Recommendation (Jan. 23, 2007), has succeeded the XPath 1.0 specification.

XPath expressions operate over a tree structure that is specified by the specification. The tree structure, which we term "Data Model" for the purposes of this document, concretely may be represented by various forms, one of which is SDO. This data model conforms to an instance of XML-Schema meta-information. While XML-Schema provides a way to specify that elements of one name may be substituted for elements of another name (known as Substitution Groups), and a way to specify that elements may be duplicated, XPath does not provide any special mechanisms to allow convenient addressing of such elements across different data model instances The concrete data model is often a specific form that is optimal for a specific software component. Service data objects (SDO) are one such form of a concrete data model, and provide a framework for data application development, which includes an architecture and application programming interface (API). SDO supports compound data objects as a graph of data objects which incorporate a change history for each node of the graph. In this regard, SDO client modifications of the data graph are reflected in an internal change summary data structure. In operation, upon submission of a modified SDO graph, a data mediator service propagates the changes specified by the change summary to the ultimate data source. SDO uses XML-Schema to represent it's meta-information. SDO also provides a specialized and simplified form of addressing known as SDOPath. SDOPath implicitly deals with Substitution Groups and repeating elements. A user who is moving from SDOPath to XPath will find it difficult to explicitly specify this addressing.

It will be apparent to the skilled artisan that SDO simplifies the data programming model in object oriented computing and abstracts data in a service oriented architecture (SOA). SDO further unifies data application development and supports and integrates XML. Thus, SDO provides an advanced and able data model for supporting enterprise class data driven applications.

BRIEF SUMMARY OF THE INVENTION

Embodiments of the present invention address deficiencies of the art in respect to content processing through expression language evaluation and provide a novel and non-obvious method, system and computer program product for expression evaluation of content instances of multiple different data models. In an embodiment of the invention, a method for expression evaluation of content instances over multiple different data models comprises loading a schema for a content instance in memory of a computer and evaluating an expression against the content instance. In response to a failure during the evaluation of the expression against the content instance to resolve a reference to an element specified by the expression, an alias reference for the element can be identified in the schema and the evaluation can be completed using the alias reference in lieu of the specified reference.

In another embodiment of the invention, a message data processing system can be provided. The system can include a message broker executing in memory of a host server configured for communicative coupling to other computers over a computer communications network. The system also can include a message processor coupled to the message broker and configured to route messages received by the message broker. Finally, the system can include a multi-data model message element resolution module coupled to the message processor. The module can include program code enabled upon execution in the host server to evaluate an expression against a message received in the message broker and to respond to a failure during the evaluation of the expression to resolve a reference to an element specified by the expression, by identifying in a schema for the message an alias reference for the element and completing the evaluation using the alias reference in lieu of the specified reference. In one aspect of the embodiment, the schema is an XML schema. In another aspect of the embodiment, the expression is an XPATH expression. In yet another aspect of the embodiment, the element models data according to the SDO data model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for XPATH expression evaluation of content instances over multiple, different data models. In accordance with an embodiment of the invention, an expression conforming to an expression language configured to process content formatted according to a corresponding data model can be evaluated against a content instance formatted according to a different data model. Specifically, a schema for the content instance can specify alternate labels for portions of the content instance. Thereafter, during evaluation of the expression, when a construct within the expression is not recognized as a valid construct for the corresponding data model, an alternative construct for the different data model specified within the schema can be resolved for the expression in lieu of the construct specified by the expression. As a result, the content instance itself need not be converted from the corresponding data model to the different data model prior to evaluating the expression.

Figure 1:
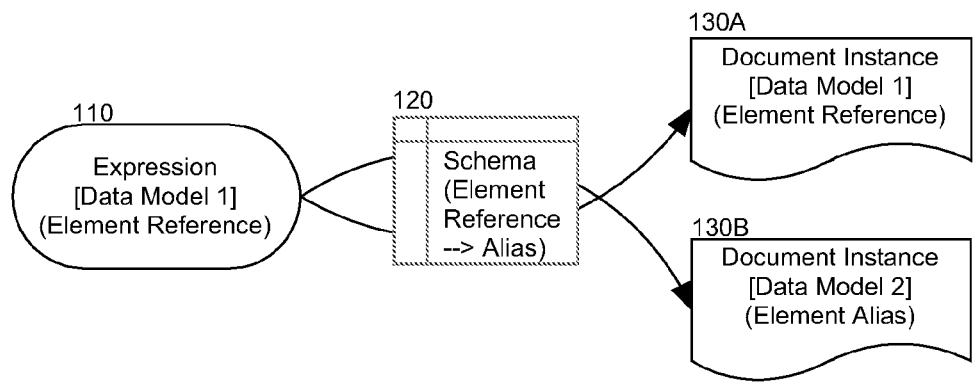
FIG. 1 is a pictorial illustration of a process for expression evaluation of content instances over multiple different data models.

In further illustration, FIG. 1 pictorially shows a process for expression evaluation of content over multiple data models. As shown in FIG. 1, a schema 120 can be provided for different document instances 130A, 130B conforming to primary and secondary data models, respectively, such as XML or SDO. The schema 120 can specify for at least one reference to a data element in the document instances 130A, 130B an alias reference to the data element. Thereafter, an expression 110 conforming to the primary data model, for instance an XPATH expression, can be applied to the document instance 130A according to the at least one reference to the data element. However, the same expression 110 conforming to the primary data model can be applied to the document instance 130B according to the alias reference to the data element set forth in the schema 120. In this way, the same expression 110 can accommodate document instances 130A, 130B representative of multiple different data models without requiring the transcoding of the document instances 130A, 130B into a uniform data model.

Figure 2:
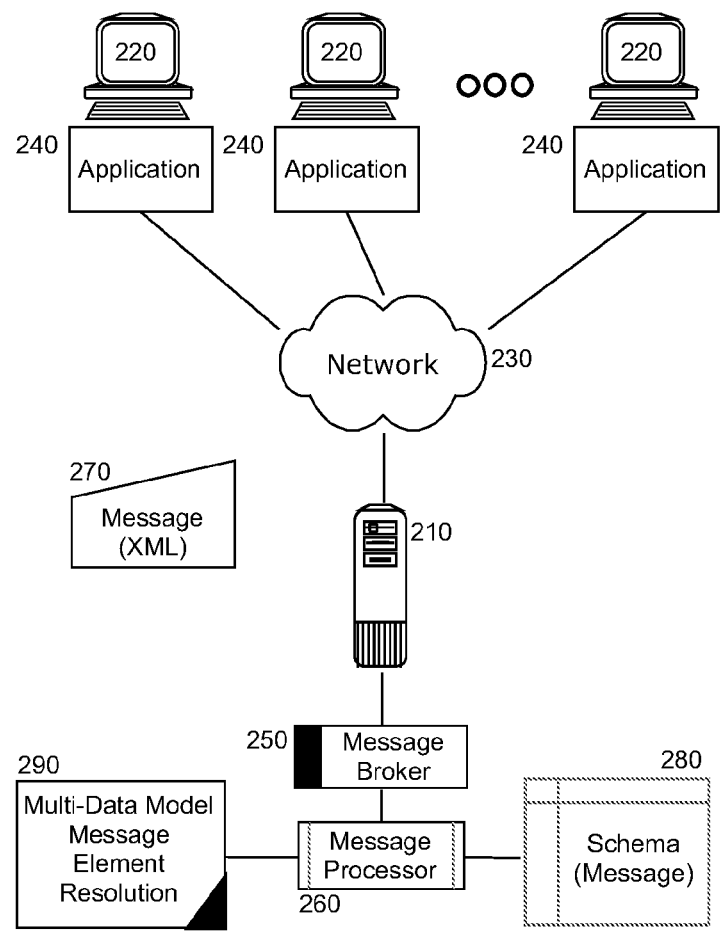
FIG. 2 is a schematic illustration of a message data processing system configured for XPATH expression evaluation of content instances over multiple, different data models; and, FIG. 3 is a flow chart illustrating a process for XPATH expression evaluation of content instances over multiple, different data models.

The process described in connection with FIG. 1 can be applied to the field of message processing and implemented within a message data processing system. In yet further illustration, FIG. 2 schematically shows a message content data processing system configured for XPATH expression evaluation of message content over multiple data models. The system can include a host server 210 with at least one processor and memory configured for communicative coupling over computer communications network 230 to different client computers 220, each supporting the execution of at least one application 240. Each of the applications 240 in turn can communicate with a message broker 250 hosted by host server 210 by way of different messages 270 (only a single message shown for the purpose of illustrative simplicity).

The message broker 250 can be configured to process and route messages 270 received from the applications 240 to additional programmatic logic, either residing within host server 210, or within a different computing environment outside of the host server 210 but communicatively coupled to the host server 210 over the computer communications network 230. A message processor 260 can be coupled to the message broker 250 and can process the content of the messages 270 in reference to a schema 280 for the messages 270 to which the messages 270 conform in order to determine how to route the messages 270. In this regard, to the extent the messages are formatted according to XML, the schema 280 can be an XML schema 280, however, for at least one element reference in the messages 270, the schema 280 can specify an alias reference.

Of note, a multi-data model message element resolution module 290 can be coupled to the message processor 260. The module 290 can include program code enabled to receive a message 270 and to evaluate an XPATH expression with respect to the XML content of the message 270. The program code of the module 290 further can be enabled to respond to a failure to recognize a reference to an element in the message 270 specified by the XPATH expression by referring to the schema 280 for an alias reference to the element in the message 270 and to continue to evaluate the XPATH expression with the alias reference in lieu of the specified reference. Thereafter, the message 270 can be routed by the message broker 250 according to the content of the message 270.

Figure 3:
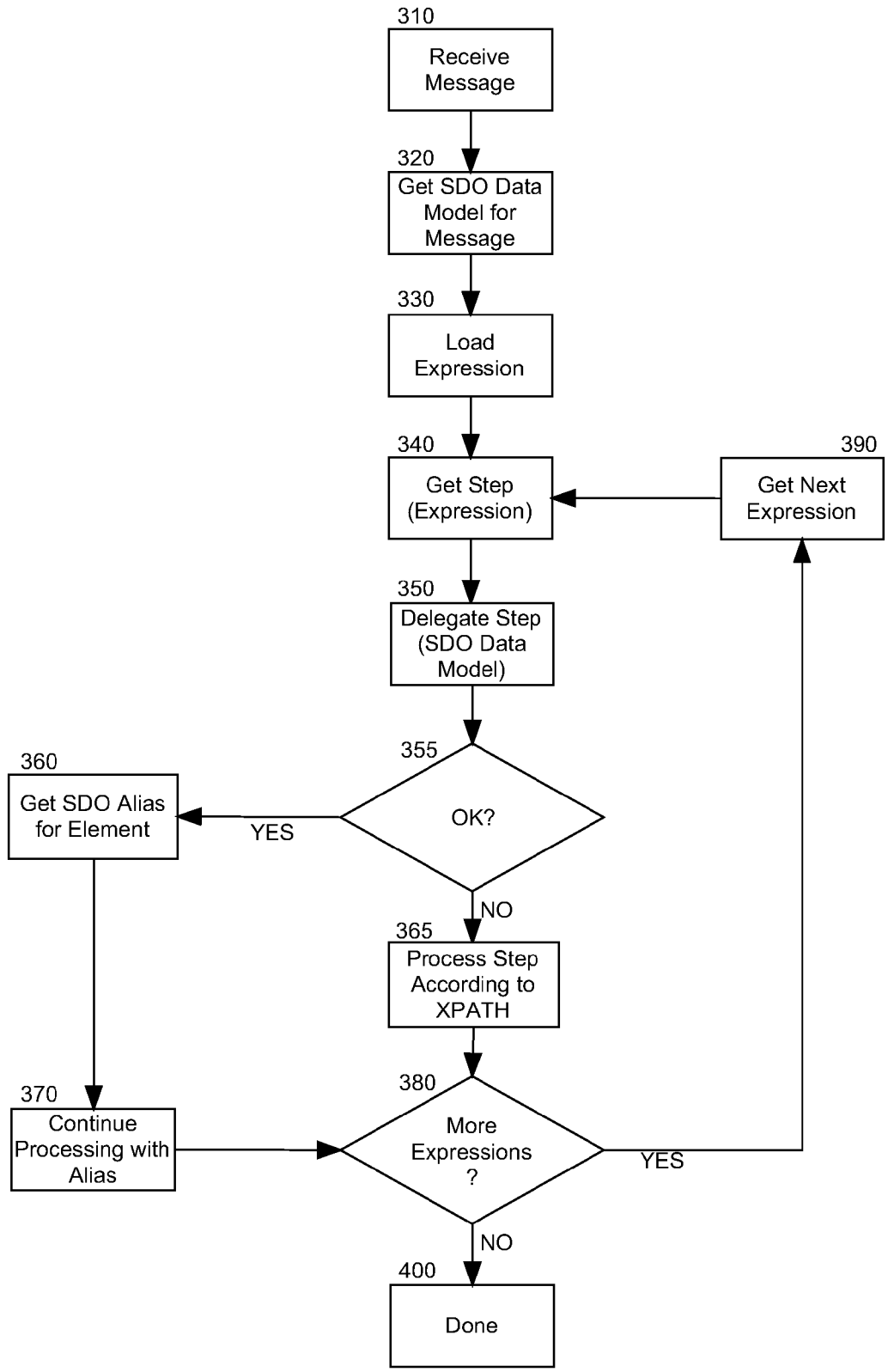

In even yet further illustration of the operation of the program code of the module 290, FIG. 3 is a flow chart illustrating a process for XPATH expression evaluation of message content over multiple data models. Beginning in block 310 a message can be received for processing that incorporates both XML represented data and SDO represented data. In block 320 an SDO data model can be retrieved for the message that provides for at least one element of the message content, a primary reference according to the XML data model and an alias reference for the SDO data model. For example, a schema for the SDO data model can provide:

```
<?xml version="1.0" encoding="UTF-8"?>
<xsd:schema targetNamespace="http://Example"
  xmlns:xsd="http://www.w3.org/2001/XMLSchema"
  xmlns:tns="http://Example">
    <xsd:complexType name="HasSubstitutions">
      <xsd:sequence>
        <xsd:element ref="tns:head"/>
      </xsd:sequence>
    </xsd:complexType>
    <xsd:element name="head" type="xsd:string"/>
    <xsd:element name="sub1" type="xsd:string"
      substitutionGroup="tns:head"/>
    <xsd:element name="sub2" type="xsd:string"
      substitutionGroup="tns:head"/>
</xsd:schema>
``` such that the alias reference "head" is an alias reference (more generic reference) for the primary element references "sub1" and "sub2".

In block 330, an expression can be loaded to navigate the message content and in block 340 a first navigation step in the expression can be selected for processing. In block 350, the step can be delegated for processing in the SDO data model leveraging, if possible, meta-data for the SDO data model. In decision block 355, it can be determined whether or not the SDO data model is to process the step according to SDO. For example, it can be determined that the meta-data for the SDO data model can more readily process the step rather than XPATH expression evaluation. If it is determined to proceed according to the SDO data model, then in block 360 an alias for the reference to the element can be identified in the SDO data model and in block 370 evaluation of the step against the message content can proceed utilizing the alias reference in lieu of the reference specified by the step. However, if in decision block 355 it is determined that the step is to be evaluated according to XPATH, then in block 365 the step is evaluated according to XPATH. In decision block 380, of additional steps of the expression remain to be processed against the message content, in block 390 a next step of the expression can be retrieved and the process can repeat through block 340. Otherwise, the process can end in block 400.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A message data processing system comprising:
    a host server configured for communicative coupling to other computers over a computer communications network, the host server including a processor and a memory, and further including:
    a message broker executed in the memory;
    a message processor coupled to the message broker and configured to route messages received by the message broker; and,
    a multi-data model message element resolution module coupled to the message processor, the module comprising program code enabled upon execution in the host server to evaluate an expression against a message received in the message broker and to respond to a failure during the evaluation of the expression to resolve a reference to an element specified by the expression, by identifying in a schema for the message an alias reference for the element and completing the evaluation using the alias reference in lieu of the specified reference.

2. The system of claim 1, wherein the schema is an extensible markup language (XML) schema.

3. The system of claim 1, wherein the expression is an XML Path (XPATH) expression.

4. The system of claim 3, wherein the element models data according to the service data object (SDO) data model.

5. A computer program product for expression evaluation of content instances over multiple different data models, the computer program product comprising:
    a computer memory having computer readable program code embodied therewith, the computer readable program code comprising:
    computer readable program code for loading a schema for a content instance in memory of a computer;
    computer readable program code for evaluating an expression against the content instance; and,
    computer readable program code for responding to a failure during the evaluation of the expression against the content instance to resolve a reference to an element specified by the expression, by identifying in the schema an alias reference for the element and completing the evaluation using the alias reference in lieu of the specified reference.

6. The computer program product of claim 5, wherein the schema is an extensible markup language (XML) schema.

7. The computer program product of claim 6, wherein the expression is an XML Path (XPATH) expression.

8. The computer program product of claim 7, wherein the element models data according to the service data object (SDO) data model.

9. The computer program product of claim 5, wherein the content instance is a message, the computer program product further comprising computer readable program code for routing the message subsequent to completing the evaluation of the expression against the message.

* * * * *